(12) United States Patent
Fujioka

(10) Patent No.: US 10,948,464 B2
(45) Date of Patent: Mar. 16, 2021

(54) LIQUID CHROMATOGRAPH MASS SPECTROMETER

(71) Applicant: SHIMADZU CORPORATION, Kyoto (JP)

(72) Inventor: Shingo Fujioka, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 138 days.

(21) Appl. No.: 16/348,898

(22) PCT Filed: Dec. 14, 2017

(86) PCT No.: PCT/JP2017/044953
§ 371 (c)(1),
(2) Date: May 10, 2019

(87) PCT Pub. No.: WO2018/154932
PCT Pub. Date: Aug. 30, 2018

(65) Prior Publication Data
US 2019/0277813 A1    Sep. 12, 2019

(30) Foreign Application Priority Data
Feb. 21, 2017 (JP) .............................. JP2017-029576

(51) Int. Cl.
*G01N 30/72* (2006.01)
*G01N 30/38* (2006.01)
(Continued)

(52) U.S. Cl.
CPC ............. *G01N 30/38* (2013.01); *G01N 27/62* (2013.01); *G01N 30/26* (2013.01); *G01N 30/72* (2013.01);
(Continued)

(58) Field of Classification Search
CPC ........ G01N 27/62; G01N 30/26; G01N 30/38; G01N 30/72; G01N 30/7233; G01N 30/86; G01N 2030/027
See application file for complete search history.

(56) References Cited

U.S. PATENT DOCUMENTS 5,083,021 A * 1/1992 Devant .................. H01J 49/10
250/289
5,738,133 A * 4/1998 Seki ........................ G01N 30/32
137/115.26
(Continued)

FOREIGN PATENT DOCUMENTS

JP    2006-162256 A    6/2006

OTHER PUBLICATIONS

Written Opinion of the International Searching Authority of PCT/JP2017/044953 dated Mar. 6, 2018.
(Continued)

*Primary Examiner* — David J Bolduc
(74) *Attorney, Agent, or Firm* — Sughrue Mion, PLLC

(57) ABSTRACT

A lid member 24 of a valve device 6 is detachably attached to a main body housing 21 fixed to a casing 5. A connection pipe is attached to the lid member 24. A pipe fitting 40 is connected to a pipe fixed to the casing 5. When the lid member 24 is mounted to the main body housing 21, the connection pipe is inserted in the pipe fitting 40 connected to the pipe 11. Thus, the lid member 24 can be mounted to the main body housing 21, with the lid member disposed at a fixed position relative to the main body housing 21. When the lid member 24 is detached from the main body housing 21, the connection pipe 25 is separated from the internal of the pipe fitting 40, and thus, the pipe 11 connected to the pipe fitting 40 does not move together with the lid member 24, and is maintained to be disposed at the fixed position in the
(Continued)

casing 5. As a result, the pipe 11 can be prevented from hindering operation of an operator.

3 Claims, 8 Drawing Sheets

(51) Int. Cl.
    *G01N 30/26*     (2006.01)
    *G01N 30/86*     (2006.01)
    *G01N 27/62*     (2021.01)
    *G01N 30/02*     (2006.01)

(52) U.S. Cl.
    CPC ......... *G01N 30/7233* (2013.01); *G01N 30/86* (2013.01); *G01N 2030/027* (2013.01)

(56) References Cited

U.S. PATENT DOCUMENTS

| | | | | |
|---|---|---|---|---|
| 5,908,995 | A * | 6/1999 | Pauchon | B01D 11/0203 |
| | | | | 73/866 |
| 6,324,892 | B1 * | 12/2001 | Nishina | G01N 1/26 |
| | | | | 73/23.2 |
| 7,651,280 | B2 * | 1/2010 | Mueller | G01N 21/05 |
| | | | | 385/92 |
| 7,752,890 | B2 * | 7/2010 | Weitz | G01M 3/16 |
| | | | | 73/40.5 R |
| 9,518,961 | B2 * | 12/2016 | Takahashi | G01N 30/16 |
| 10,830,739 | B2 * | 11/2020 | Anderer | B01D 15/242 |
| 2006/0118713 | A1 | 6/2006 | Matsui et al. | |
| 2006/0261964 | A1 * | 11/2006 | Maetzke | G05D 9/12 |
| | | | | 340/605 |
| 2016/0146716 | A1 * | 5/2016 | Cros | G01N 27/62 |
| | | | | 250/282 |
| 2016/0203965 | A1 * | 7/2016 | Rorick | G01N 30/95 |
| | | | | 250/288 |
| 2018/0100836 | A1 * | 4/2018 | Suzuki | G01N 30/6047 |
| 2018/0202983 | A1 * | 7/2018 | Jung | G01M 3/26 |
| 2019/0324373 | A1 * | 10/2019 | Kamimura | G03F 7/7065 |
| 2020/0041467 | A1 * | 2/2020 | Vorm | G01N 30/08 |
| 2020/0124576 | A1 * | 4/2020 | Kobold | G01N 30/88 |

OTHER PUBLICATIONS

International Search Report of PCT/JP2017/044953 dated Mar. 6, 2018.

* cited by examiner

LIQUID CHROMATOGRAPH MASS SPECTROMETER

CROSS REFERENCE TO RELATED APPLICATIONS

This application is a National Stage of International Application No. PCT/JP2017/044953 filed Dec. 14, 2017, claiming priority based on Japanese Patent Application No. 2017-029576 filed Feb. 21, 2017.

TECHNICAL FIELD

The present invention relates to a liquid chromatograph mass spectrometer that is a combination of a liquid chromatograph configured to separate components in a sample and a mass spectrometer configured to perform mass spectrometry on the sample components separated by the liquid chromatograph.

BACKGROUND ART

A liquid chromatograph mass spectrometer that is a combination of a liquid chromatograph and a mass spectrometer has conventionally been used. In the liquid chromatograph mass spectrometer, first of all, a sample is introduced into a column of the liquid chromatograph, and components in the sample are separated. Then, the sample components thus separated are sent to the mass spectrometer to be subjected to mass spectrometry (see, for example, Patent Document 1 as mentioned below).

Generally, such a liquid chromatograph mass spectrometer is provided with a valve interposed in a flow path in which the sample flows from the liquid chromatograph to the mass spectrometer. Other flow paths, such as a flow path for introducing a standard sample and a drain flow path, are connected to the valve. Switching among the flow paths is appropriately implemented at the valve so that a flow path suitable for an operation in the liquid chromatograph mass spectrometer can be formed.

The sample passing in the valve might overflow. Thus, the spectrometer generally has a tray installed therein to receive the sample overflowed from the valve.

PRIOR ART DOCUMENTS

Patent Documents

Patent Document 1: JP 2006-162256 A

SUMMARY OF THE INVENTION

Problems to be Solved by the Invention

It is contemplated to provide the mass spectrometer with the valve in the liquid chromatograph mass spectrometer. In this configuration, the tray is provided away from the valve, and a hose extending to the tray is connected to the valve, because the mass spectrometer has a limited internal space. Thus, the sample overflowed from the valve is discharged to the tray through the hose.

Such a valve may be operated by an operator in a case where maintenance is performed on an internal member of the valve and in the other like cases. In such a case, an operation by the operator on the valve is hindered by the hose connected to the valve, and thus is performed with low workability.

The present invention is made in view of the above, and an object of the present invention is to provide a liquid chromatograph mass spectrometer that can improve the workability for a valve device.

Means for Solving the Problems (1) A liquid chromatograph mass spectrometer according to the present invention is a liquid chromatograph mass spectrometer that is a combination of a liquid chromatograph that separates components in a sample and a mass spectrometer that performs mass spectrometry on the components separated by the liquid chromatograph. The chromatograph mass spectrometer includes a mass spectrometry section, a casing, a valve device, and a pipe fitting. The mass spectrometry section performs the mass spectrometry. The casing accommodates the mass spectrometry section. The valve device is interposed in a flow path for the sample from the liquid chromatograph to the mass spectrometry section and is attached to the casing. A liquid discharge pipe that communicates with a liquid discharge section is connected to the pipe fitting. The valve device includes a main body housing, a flow path switching mechanism, a lid member, and a connection pipe. The main body housing is attached in the casing and has an opening section. The flow path switching mechanism is accommodated in the main body housing and switches the flow path. The lid member is detachably attached to the main body housing, includes a flow path connection section to which the flow path from the liquid chromatograph is connected, and closes the opening section of the main body housing. The connection pipe is attached to the lid member and connected to the pipe fitting to enable the sample leaked on the lid member from the flow path connection section to be discharged to the liquid discharge pipe. In the liquid chromatograph mass spectrometer, the connection pipe is inserted in the pipe fitting in a state where the lid member is mounted to the main body housing.

With this configuration, when the maintenance is performed on the flow path switching mechanism accommodated in the main body housing, the lid member is detached from the main body housing, so that an operation can be easily performed on the flow path mechanism in the main body housing.

When the lid member is thus detached from the main body housing, the connection pipe is separated from the internal of the pipe fitting.

Thus, the liquid discharge pipe connected to the pipe fitting does not move together with the lid member, and is maintained to be disposed at the fixed position.

As a result, the liquid discharge pipe can be prevented from hindering the operation of the operator.

When the lid member is mounted to the main body housing, the connection pipe attached to the lid member is inserted in the pipe fitting.

Thus, the lid member can be mounted to the main body housing, with the lid member disposed at a fixed position relative to the main body housing (positioned at the fixed position).

As a result, the lid member can be prevented from being mounted to the main body housing with a wrong orientation relative to the main body housing.

Thus, the liquid chromatograph mass spectrometer according to the present invention can improve workability for the valve device.

(2) A groove having a V cross-sectional shape into which the sample leaked from the flow path connection section flows may be formed on the lid member, and the connection pipe may communicate with a bottom section of the groove.

For example, when a groove having a cornered U cross-sectional shape is formed on the lid member and a sample having strong surface tension leaks from the flow path member, the sample may not smoothly move in the groove due to the surface tension.

The configuration described above has the groove having the V cross-sectional shape on the lid member.

Thus, even a sample having strong surface tension leaked from the flow path connection member can smoothly move in the groove to be transmitted to the connection pipe.

Furthermore, the groove through which the sample leaked from the flow path member can have a smaller cross-sectional area than the recess having a cornered U cross-sectional shape formed on the lid member.

Thus, the sample leaked from the flow path member can be transmitted to the connection pipe in a shorter period of time.

(3) The liquid discharge section may include a liquid discharge tray and a liquid discharge sensor. The liquid discharge tray receives the sample discharged from the connection pipe through the pipe fitting and the liquid discharge pipe. The liquid discharge sensor detects the sample discharged into the liquid discharge tray.

With this configuration, the sample leaked from the flow path connection section of the valve device is discharged from the connection pipe through the pipe fitting and the liquid discharge pipe, and is detected by the liquid discharge sensor.

Thus, the leakage of the sample from the valve device can be easily recognized through the detection by the liquid discharge sensor.

Effects of the Invention

According to the present invention, when the lid member is detached from the main body housing, the connection pipe is separated from the internal of the pipe fitting. Thus, the liquid discharge pipe connected to the pipe fitting does not move together with the lid member, and is maintained to be disposed at the fixed position. As a result, the liquid discharge pipe can be prevented from moving along with the lid member to hinder the operation of the operator. When the lid member is mounted to the main body housing, the connection pipe attached to the lid member is inserted in the pipe fitting. Thus, the lid member can be mounted to the main body housing, with the lid member positioned at a fixed position relative to the main body housing. As a result, the lid member can be prevented from being mounted to the main body housing with a wrong orientation relative to the main body housing.

MODE FOR CARRYING OUT THE INVENTION

1. Configuration of Liquid Chromatograph Mass Spectrometer

Figure 1:
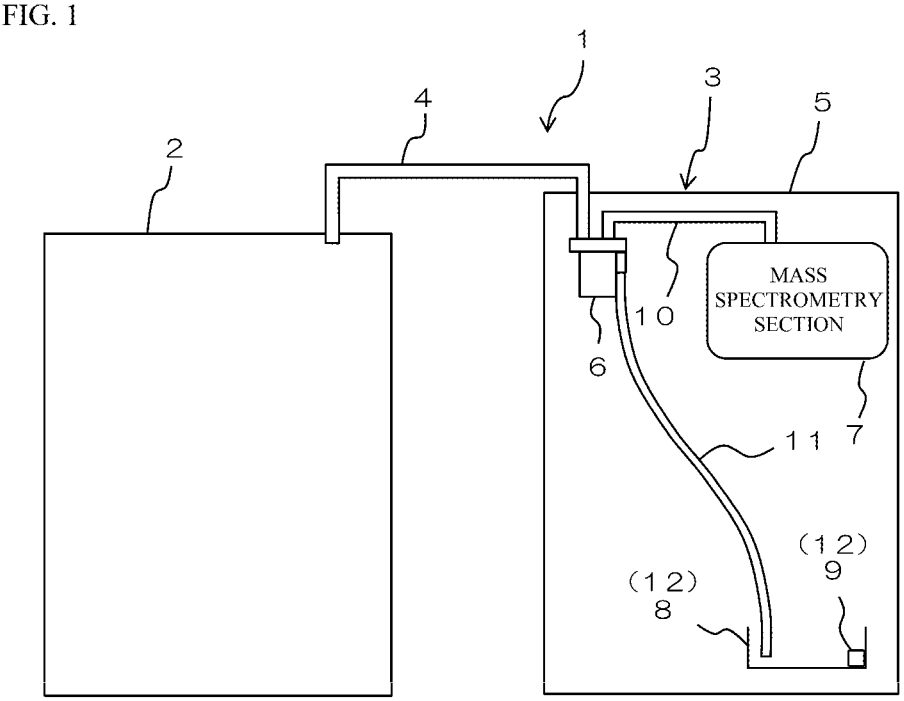
FIG. 1 is a schematic view illustrating a configuration of a liquid chromatograph mass spectrometer according to one embodiment of the present invention.

FIG. 1 is a schematic view illustrating a configuration of a liquid chromatograph mass spectrometer 1 according to one embodiment of the present invention.

The liquid chromatograph mass spectrometer 1 is a device obtained by combining a liquid chromatograph (LC) 2 that separates components in sample, and a mass spectrometer (MS) 3 that performs mass spectrometry on the sample components separated by the liquid chromatograph 2.

Although not elaborated in the figure, in the liquid chromatograph 2, a mobile phase stored in a storage tank is sent to a column at a predetermined flowrate. The sample is injected into the mobile phase, and the sample components in the mobile phase are separated in time in the column. The separated sample components are transmitted to the mass spectrometer 3 through a pipe 4.

The mass spectrometer 3 includes a casing 5, a valve device 6, a mass spectrometry section 7, a liquid discharge tray 8, a liquid discharge sensor 9, and pipes 10 and 11.

The casing 5 is formed to have a hollow box form.

The valve device 6 is attached in the casing 5. The sample components flow from the liquid chromatograph 2 to the valve device 6 through the pipe 4. The sample components thus flowed into the valve device 6 from the liquid chromatograph 2 flows to the mass spectrometry section 7 through the pipe 10. In this manner, the valve device 6 is interposed on the flow path in which the sample flows from the liquid chromatograph 2 to the mass spectrometry section 7. A detailed configuration of the valve device 6 will be described later.

The mass spectrometry section 7 is accommodated in the casing 5. In the mass spectrometry section 7, the sample components introduced are ionized, and the resultant ions are separated based on their mass-to-charge ratios (m/z). Then, a detector detects the ions thus separated to implement mass spectrometry.

The liquid discharge tray 8 is disposed at a position separated from the valve device 6 in the casing 5. The pipe 11 is fixed to the casing 5, to extend from the valve device 6 to the liquid discharge tray 8.

The liquid discharge sensor 9 is provided in the liquid discharge tray 8. The liquid discharge sensor 9 is configured to detect the sample discharged into the liquid discharge tray 8. The liquid discharge sensor 9 and the liquid discharge tray 8 form a liquid discharge section 12.

When a sample is analyzed in the liquid chromatograph mass spectrometer 1, the sample components separated by the liquid chromatograph 2 flow into the mass spectrometry section 7 through the pipe 4, the valve device 6, and the pipe 10. The sample leaked from the valve device 6 in this process is discharged into the liquid discharge tray 8 through the pipe 11. The sample discharged into the liquid discharge tray 8 is detected by the liquid discharge sensor 9.

Figure 2:
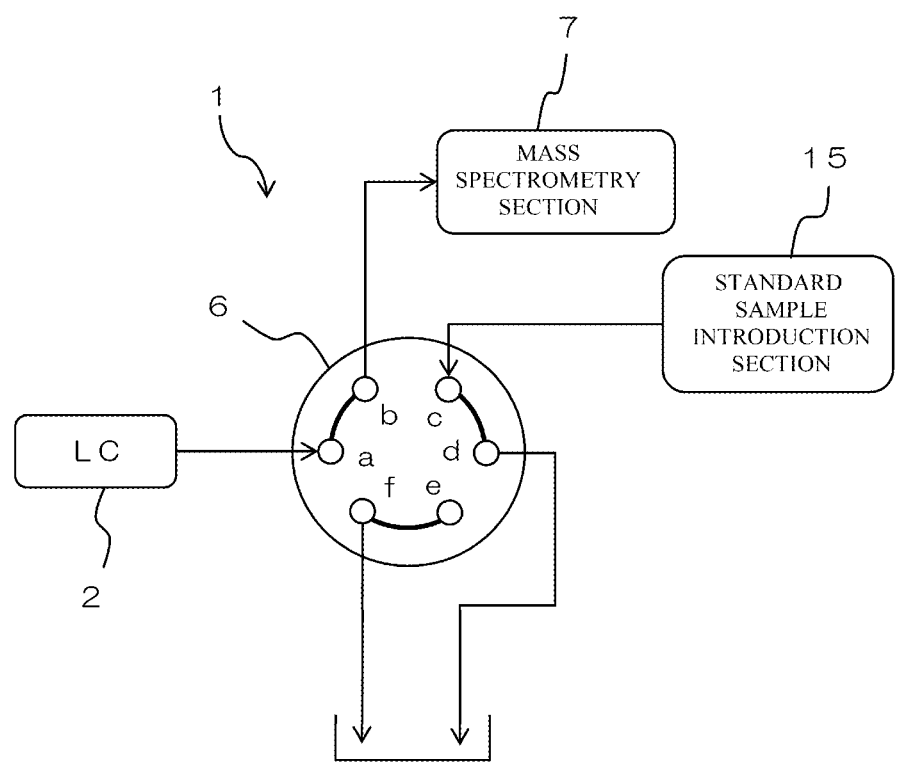
FIG. 2 is a diagram illustrating a flow path in the liquid chromatograph mass spectrometer in FIG. 1, and illustrates a state where sample components flow from a liquid chromatograph to a mass spectrometry section.

FIG. 2 illustrates a flow path in the liquid chromatograph mass spectrometer 1 in this process. FIG. 2 is a diagram illustrating a flow path in the liquid chromatograph mass spectrometer 1, and illustrates a state where the sample components flow from the liquid chromatograph 2 to the mass spectrometry section 7.

As illustrated in FIG. 2, the valve device 6 includes six ports a to f. The ports a to f correspond to openings 241A of a lid member 24 described later. The port a of the valve device 6 is in communication with the internal of the liquid chromatograph 2. Thus, the pipe 4 (see FIG. 1) is connected to the port a of the valve device 6. The port b of the valve device 6 is in communication with the mass spectrometry section 7. Thus, the pipe 10 (see FIG. 1) is connected to the port b of the valve device 6.

The port c of the valve device 6 is in communication with a standard sample introduction section 15. The standard sample introduction section 15 is configured to transmit a standard sample (STD) to the valve device 6. The port d and the port f of the valve device 6 are in communication with a drain flow path.

FIG. 2 illustrates a state where the port a and the port b as well as the port c and the port d of the valve device 6 are in communication with each other. Thus, as described above, the sample components separated in the liquid chromatograph 2 flow into the mass spectrometry section 7 via the valve device 6. The standard sample sent from the standard sample introduction section 15 is discharged into the drain flow path through the valve device 6.

Figure 3:
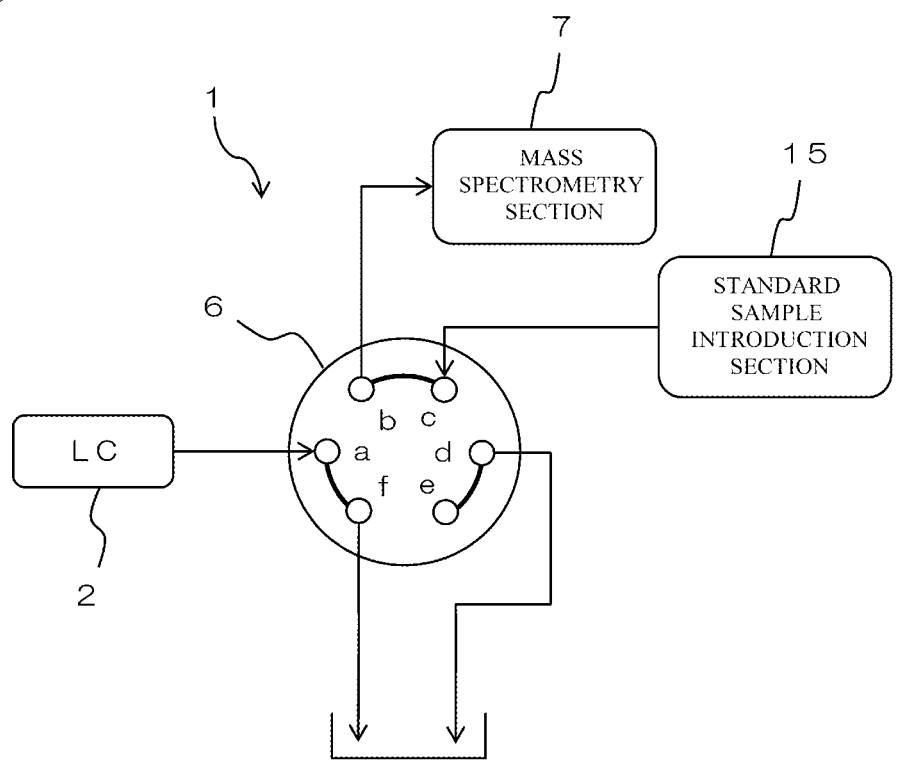
FIG. 3 is a diagram illustrating a state where a flow path of a valve device is switched from that in the state illustrated in FIG. 2.

FIG. 3 is a diagram illustrating a state where a flow path of the valve device 6 is switched from that in the state illustrated in FIG. 2. In this state, the port a and the port f as well as the port b and the port c of the valve device 6 are in communication with each other. Thus, the standard sample sent from the standard sample introduction section 15 flows into the mass spectrometry section 7 via the valve device 6. A mobile phase including no sample flows in the liquid chromatograph 2, and is discharged into the drain flow path via the valve device 6.

In the liquid chromatograph mass spectrometer 1, an analysis operation is performed with the flow path switched with the valve device 6 as appropriate, as described above. The valve device 6 accommodates a mechanism for switching the flow path as described later, and thus requires regular maintenance and the like. In the liquid chromatograph mass spectrometer 1, the valve device 6 has the following configuration to enable work to be smoothly performed on the valve device 6.

2. Detailed Configuration of Valve Device

Figure 4:
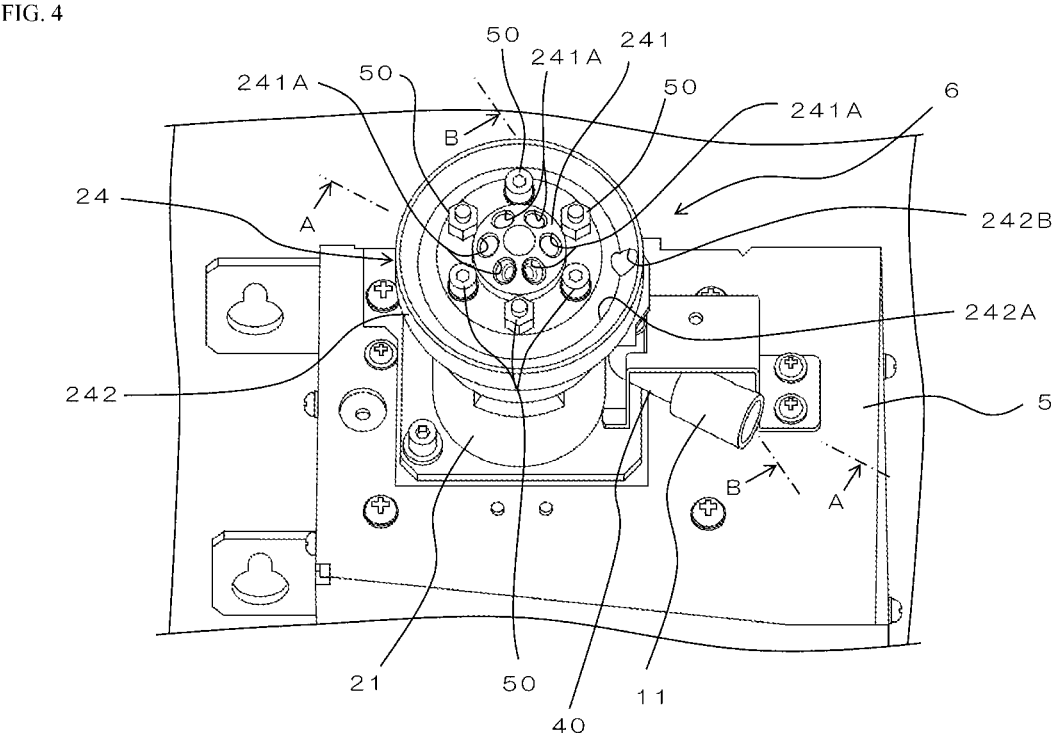
FIG. 4 is a perspective view illustrating the configuration of the valve device in FIG. 1.
Figure 5:
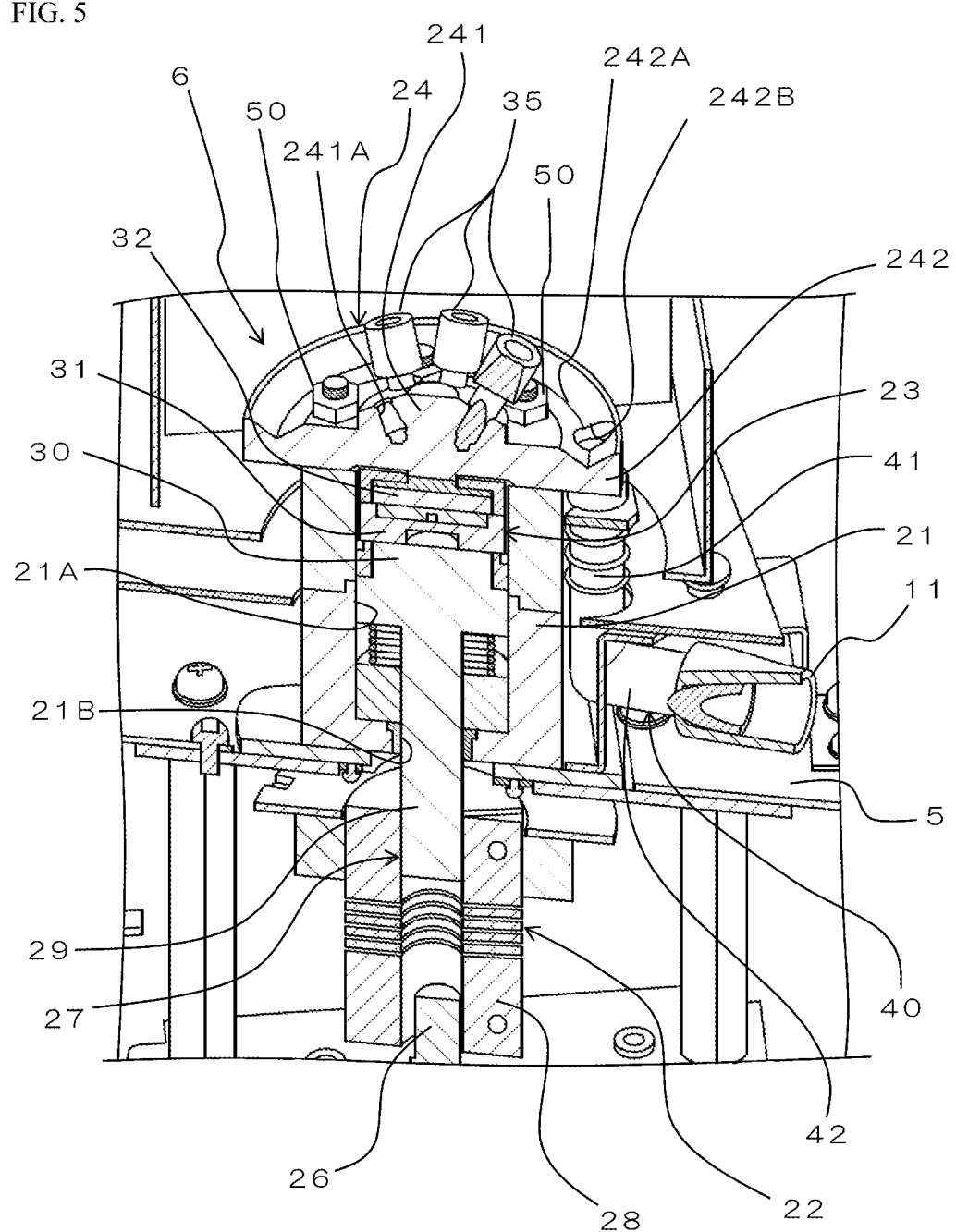
FIG. 5 is a cross-sectional view taken along line A-A in FIG. 4.

FIG. 4 is a perspective view illustrating the configuration of the valve device 6. FIG. 5 is a cross-sectional view taken along line A-A in FIG. 4. FIG. 4 illustrates a state where the casing 5 is partially omitted.

The valve device 6 includes a main body housing 21, a rotation mechanism 22, a flow path switching mechanism 23, a lid member 24, and a connection pipe 25.

The main body housing 21 is fixed to the casing 5. The main body housing 21 has a shape of a cylinder extending in an upward and downward direction. The main body housing 21 has an opening 21A and an opening 21B formed. The opening 21A is recessed downward from the upper surface of the main body housing 21 and has a circular shape in plan view. The opening 21B is formed through a lower end section of the main body housing 21 in the upward and downward direction and has a circular shape in plan view. The opening 21B is in communication with the opening 21A. The opening 21A is an example of an opening section.

As illustrated in FIG. 5, the rotation mechanism 22 is disposed in the main body housing 21 and below the main body housing 21. The rotation mechanism 22 includes a motor shaft 26, a rotating body 27, and a coupling 28.

In the casing 5, the motor shaft 26 is disposed below the main body housing 21 with a gap in between. The motor shaft 26 is formed to have a shape of a cylinder extending in the upward and downward direction. The motor shaft 26 is rotatable about an axis extending in the upward and downward direction. The motor shaft 26 rotates upon receiving driving force from an unillustrated motor.

The rotating body 27 is disposed above the motor shaft 26 with a gap in between, and is partially disposed inside the main body housing 21. The rotating body 27 includes a shaft section 29 and a holding section 30.

The shaft section 29 is formed to have a shape of a cylinder extending in the upward and downward direction. The shaft section 29 has a diameter slightly smaller than that of the opening 21B of the main body housing 21.

The holding section 30 protrudes upward from an upper end section of the shaft section 29. The holding section 30 is formed to have a shape of a cylinder extending in the upward and downward direction. The holding section 30 has a diameter larger than that of the shaft section 29 and is slightly smaller than that of the opening 21A of the main body housing 21.

The rotating body 27 is rotatably held by the main body housing 21, in a state where the shaft section 29 is inserted through the opening 21B. In this state, an upper section of the shaft section 29 and the holding section 30 are accommodated in the main body housing 21 (in the opening 21A), and a lower section of the shaft section 29 is disposed outside (below) the main body housing 21.

The coupling 28 is interposed between the shaft section 29 of the rotating body 27 and the motor shaft 26. The coupling 28 has an upper end section connected to the lower end section of the shaft section 29, and has a lower end section connected to an upper end section of the motor shaft 26. Thus, when the motor shaft 26 rotates, the rotating body 27 rotates together with the coupling 28.

The flow path switching mechanism 23 is for switching the flow path through the valve device 6. The flow path switching mechanism 23 is disposed in the main body housing 21 (in the opening 21A) and above the holding section 30 of the rotating body 27. The flow path switching mechanism 23 includes a rotor 31 and a stator 32.

The rotor 31 is disposed above the holding section 30 of the rotating body 27. The rotor 31 has a shape of a disc. A plurality of (three) grooves (not illustrated) extending in a circumferential direction are formed on the rotor 31. The rotor 31 is detachably attached to the upper surface of the holding section 30 while having a center axis matching a center axis of the holding section 30.

The stator 32 is disposed above the rotor 31. The stator 32 is formed to have a shape of a disc. The stator 32 has a plurality of (six) openings (not illustrated) formed at an interval along the circumference direction. The stator 32 is placed on the upper surface of the rotor 31 while being in a state of being fixed to a fixed position and having a center axis matching the center axis of the rotor 31.

With this configuration, when the rotating body 27 rotates, the rotor 31 rotates together with the rotating body 27. On the other hand, even when the rotating body 27 rotates, the stator 32 is held in the main body housing 21 so as to have a fixed orientation without rotating. Thus, the relative position between the plurality of grooves provided on the rotor 31 and the plurality of openings provided on the stator 32 changes so that the flow path is switched at the valve device 6.

Figure 6:
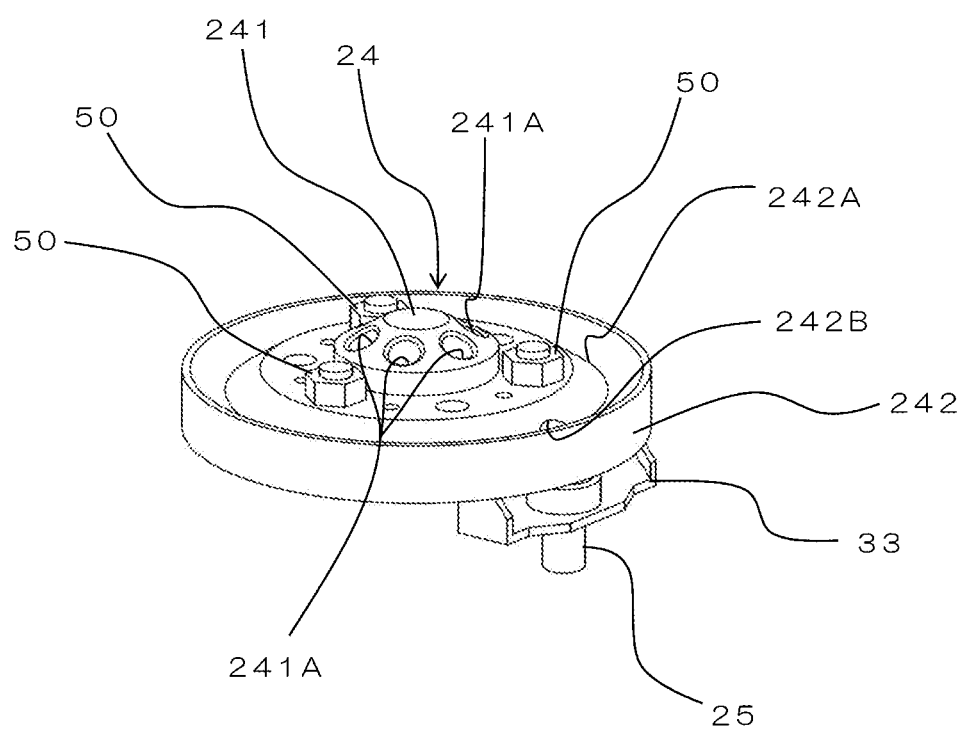
FIG. 6 is a perspective view illustrating a configuration of a lid member of the valve device.

FIG. 6 is a perspective view illustrating a configuration of the lid member 24 of the valve device 6.

As illustrated in FIG. 5 and FIG. 6, the lid member 24 is formed to have a shape of a disc with a predetermined thickness. The lid member 24 is detachably attached to the main body housing 21. The lid member 24 is mounted on the main body housing 21 in a state of extending along a horizontal plane. The lid member 24 has a larger diameter than that of the main body housing 21. The lid member 24 has a center section 241 which forms a protruding section protruding upward. The center section 241 of the lid member 24 is formed to have a shape tapered upward. The center section 241 of the lid member 24 has a plurality of (six) openings 241A formed, and an outer edge section 242 of the lid member 24 has a groove 242A and an opening 242B formed.

Each of the plurality of openings 241A is formed through the center section 241 of the lid member 24. The plurality of openings 241A are arranged at an interval along the circumference direction. Each of the plurality of openings 241A communicates with a corresponding one of the plurality of openings formed on the stator 32. These plurality of openings 241A correspond to the ports a to f (see FIG. 2). The plurality of openings 241A are an example of a flow path connection section. FIG. 5 illustrates a state where some of the openings 241A are sealed by sealing members 35. As illustrated in FIG. 5, unused ones of the plurality of openings 241A of the lid member 24 are sealed by the sealing members 35.

The groove 242A is an annular recess formed on the upper surface of the outer edge section 242 of the lid member 24 to extend in the circumference direction. The groove 242A is recessed downward from the upper surface of the outer edge section 242 to have a V cross-sectional shape.

The opening 242B is formed through the outer edge section 242 in the upward and downward direction to communicate with the groove 242A. The opening 242B has a circular shape in plan view.

Figure 7:
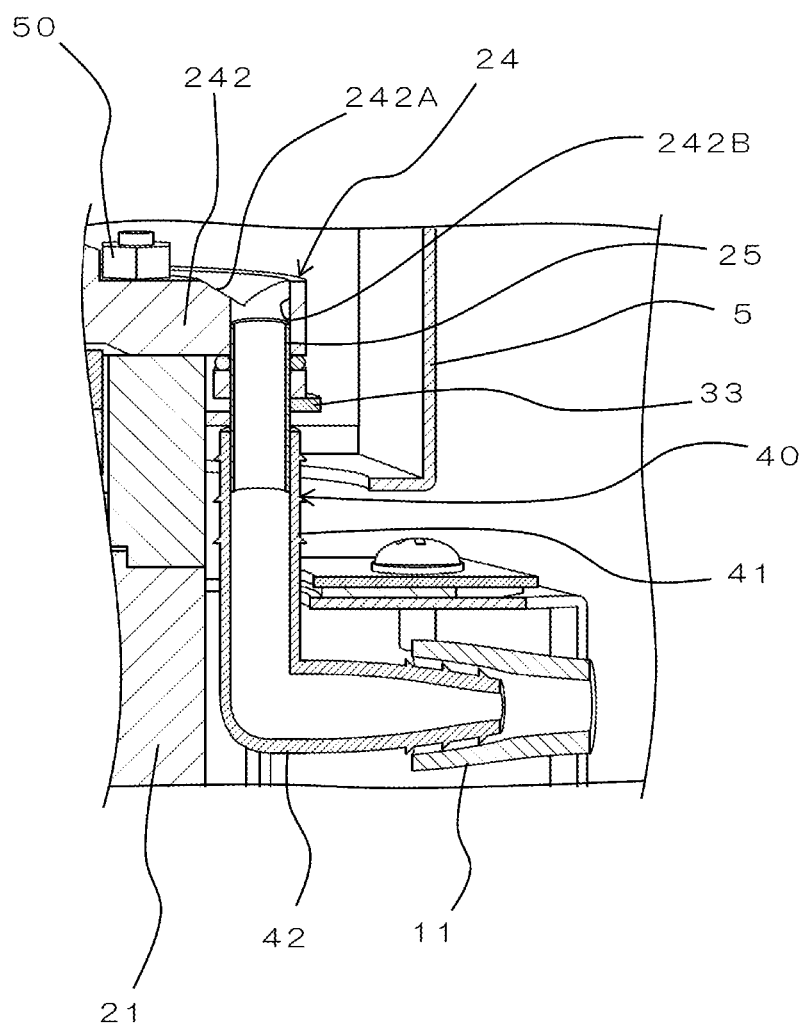
FIG. 7 is a cross-sectional view taken along line B-B in FIG. 5.

FIG. 7 is a cross-sectional view taken along line B-B in FIG. 5. As illustrated in FIG. 6 and FIG. 7, the connection pipe 25 is attached to the lid member 24 by a fixing member 33. The connection pipe 25, in the state of being attached to the lid member 24, extends in the upward and downward direction, and has an upper end section inserted in the opening 242B. The upper end section of the connection pipe 25 has an outer circumference surface in close contact with an edge section of the opening 242B of the outer edge section 242. Thus, the connection pipe 25 communicates with a bottom section of the groove 242A through the opening 242B.

As illustrated in FIG. 7, a pipe fitting 40 is provided in the casing 5. The pipe fitting 40 is fixed to the casing 5 to be positioned close to the main body housing 21. The pipe fitting 40 includes a vertical section 41 and a horizontal section 42. The vertical section 41 extends in the upward and downward direction and is positioned close to the outer circumference surface of the main body housing 21. The vertical section 41 has an upper end section positioned close to the upper end section of the main body housing 21. The horizontal section 42 continues from the lower end section of the vertical section 41 and extends in the horizontal direction (in a direction away from the main body housing 21). The horizontal section 42 has a distal end section connected to the upper end section (one end section) of the pipe 11 (see FIG. 1). In FIG. 4, FIG. 5, and FIG. 7, the pipe 11 is only partially illustrated for the sake of convenience.

3. Mounting Lid Member to Main Body Housing

Figure 8:
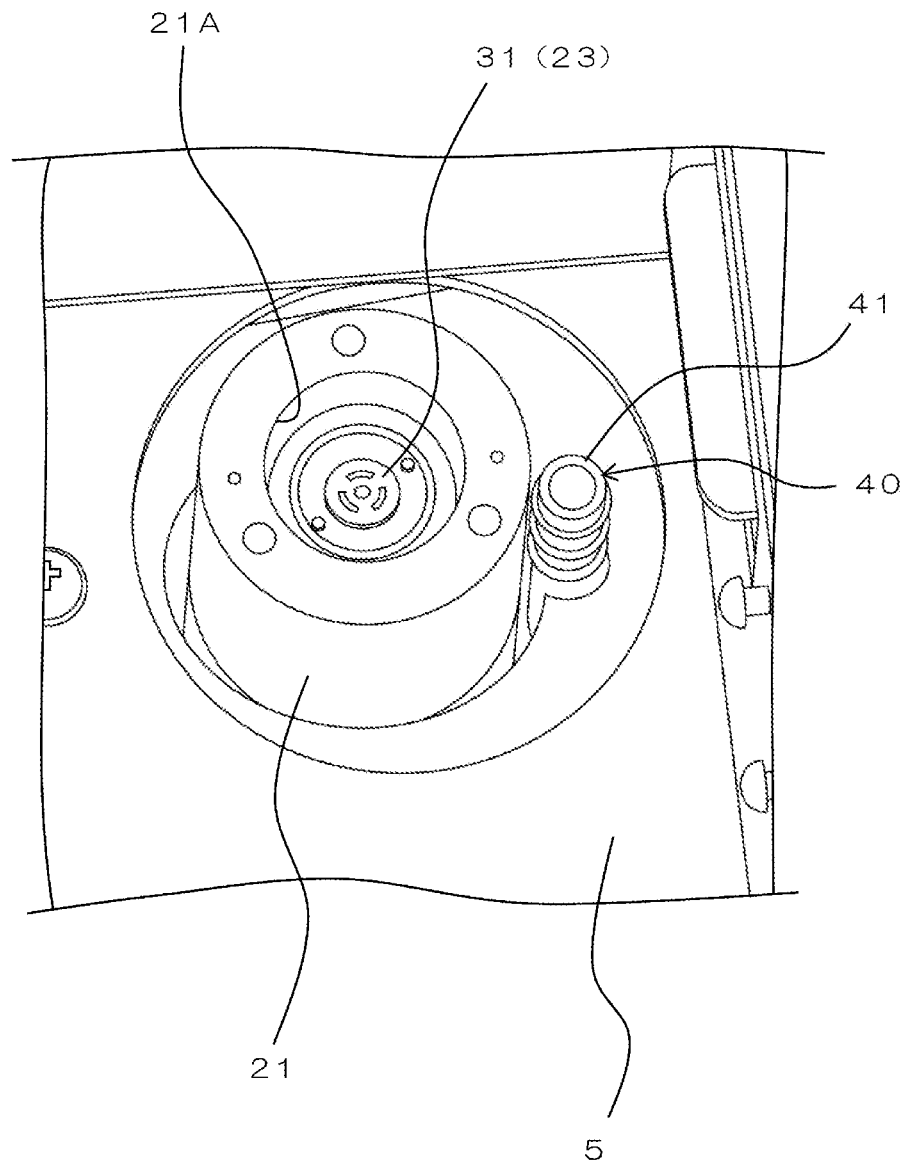
FIG. 8 is a perspective view illustrating a state where a main body housing of the valve device is attached to a casing of a mass spectrometer.

FIG. 8 is a perspective view illustrating a state where the main body housing 21 of the valve device 6 is attached to the casing 5 of the mass spectrometer 3. As described above, the main body housing 21 is attached (fixed) to the casing 5. In this state, the upper end section of the main body housing 21 and the upper end section of the vertical section 41 of the pipe fitting 40 are exposed from the casing 5. The main body housing 21 accommodates the flow path switching mechanism 23 (see FIG. 5). Although FIG. 8 illustrates a state of the flow path switching mechanism 23 where the stator 32 is taken out from the internal of the main body housing 21 and the rotor 31 is accommodated in the main body housing 21, the stator 32 is also accommodated in the main body housing 21 when the lid member 24 is attached to the main body housing 21.

In this state, the operator places the lid member 24 on the upper surface of the main body housing 21 while maintaining the state where the lid member 24 extends along the horizontal plane as illustrated in FIG. 6. Specifically, the operator places the lid member 24 on the main body housing 21 in such a manner that the connection pipe 25 is introduced in the vertical section 41 of the pipe fitting 40. As a result, the lid member 24 is placed on the main body housing 21 while maintaining the same orientation relative to the main body housing 21. Thus, the opening 21A of the main body housing 21 is closed by the lid member 24.

Then, the operator fixes the lid member 24 to the main body housing 21 using fixing members such as screws 50, as illustrated in FIG. 4 and FIG. 5.

In this manner, the lid member 24 is mounted on the main body housing 21.

4. Operation of Each Mechanism and Flow of Liquid Discharging

In the liquid chromatograph mass spectrometer 1, an analysis operation starts in the state where the lid member 24 is mounted on the main body housing 21 as illustrated in FIG. 5. At this point, the sample components separated by the liquid chromatograph 2 and the standard sample sent from the standard sample introduction section 15 are introduced into the mass spectrometer 3 through the valve device 6.

The sample components are analyzed in the liquid chromatograph mass spectrometer 1 in the following manner. Specifically, the sample components separated in the liquid chromatograph 2 pass through the opening 241A (the port a in FIG. 2) of the lid member 24, pass through a first opening of the stator 32, the groove of the rotor 31, and a second opening of the stator 32 in this order, and then pass through the opening 241A (the port b in FIG. 2) of the lid member 24 to be introduced into the liquid chromatograph 2.

A standard sample is analyzed in the liquid chromatograph mass spectrometer 1 in the following manner. Specifically, driving force from a motor is applied to the motor shaft 26 in the state described above to rotate the motor shaft 26 together with the coupling 28, the rotating body 27, and the rotor 31. Thus, the relative position between the rotor 31 and the holding section 30 changes such that the flow path is switched at the valve device 6 (see FIG. 3). Then, the standard sample sent from the standard sample introduction section 15 is introduced into the valve device 6. The standard sample passes through the opening 241A (the port c in FIG. 3) of the lid member 24, passes through a third opening of the stator 32, the groove of the rotor 31, and the second opening of the stator 32 in this order, and then passes through the opening 241A (the port b in FIG. 3) of the lid member 24 to be introduced into the liquid chromatograph 2.

When the sample thus moves through the valve device 6, overflow (leakage) of the sample from the opening 241A may occur due to poor connection of the pipe to the opening 241A of the lid member 24 or the like. The sample thus leaked flows on a slope of the center section 241 to flow into the groove 242A. Then, the sample moves in the groove 242A of the lid member 24 to flow down through the opening 242B. The sample that flows out from the opening 242B passes through the connection pipe 25, then passes through the vertical section 41 of the pipe fitting 40 and the horizontal section 42 of the pipe fitting 40 in this order, and then is discharged to the pipe 11 to be discharged into the liquid discharge tray 8 (see FIG. 1) as illustrated in FIG. 7.

5. Detachment of Lid Member from Main Body Housing

To detach the lid member 24 from the main body housing 21, the operator first removes the screws 50 from the lid member 24. Then, the operator moves the lid member 24 upward.

As a result, because the main body housing 21, the pipe fitting 40, and the pipe 11 are fixed to the casing 5, the upward movement of the lid member 24 to be separated from the main body housing 21 involves an upward movement of the connection pipe 25 to be separated from the pipe fitting 40 and the pipe 11. Thus, the connection pipe 25 moves upward without involving the movement of the pipe fitting 40 and the pipe 11 following the lid member 24.

After the lid member 24 is detached from the main body housing 21 in this manner, maintenance on an internal member of the main body housing 21, such as replacement of the flow path switching mechanism 23, is performed (see FIG. 8). This can be performed with the pipe fitting 40 and the pipe 11 maintained to be disposed inside the casing 5 instead of following the lid member 24. Thus, the pipe fitting 40 and the pipe 11 can be prevented from hindering the operation by the operator.

6. Operation and Effect (1) According to the present embodiment, as illustrated in FIG. 1, the valve device 6 is interposed in the flow path for the sample from the liquid chromatograph 2 to the mass spectrometry section 7. As illustrated in FIG. 5, the main body housing 21 of the valve device 6 is fixed to the casing 5 of the liquid chromatograph 2, and the lid member 24 of the valve device 6 is detachably attached to the main body housing 21. As illustrated in FIG. 7, the connection pipe 25 is attached to the lid member 24. The pipe fitting 40 is connected to the pipe 11 fixed to the casing 5. When the lid member 24 is mounted to the main body housing 21, the connection pipe 25 is inserted in the pipe fitting 40 connected to the pipe 11.

Thus, the lid member 24 can be mounted to the main body housing 21, with the lid member 24 disposed at a fixed position relative to the main body housing 21 (positioned at the fixed position).

As a result, the lid member 24 can be prevented from being mounted to the main body housing 21 with a wrong orientation relative to the main body housing 21.

When the maintenance is performed on the flow path switching mechanism 23 or the like accommodated in the main body housing 21, the lid member 24 is detached from the main body housing 21, so that an operation can be easily performed on the mechanism in the main body housing 21.

When the lid member 24 is thus detached from the main body housing 21, the connection pipe 25 is separated from the internal of the pipe fitting 40.

Thus, the pipe 11 connected to the pipe fitting 40 does not move together with the lid member 24, and is maintained to be disposed at the fixed position in the casing 5.

As a result, the pipe 11 can be prevented from hindering the operation of the operator.

(2) According to the present embodiment, as illustrated in FIG. 5, the groove 242A having the V cross-sectional shape is formed on the upper surface of the outer edge section 242 of the lid member 24. The sample leaked from the opening 241A of the lid member 24 moves in the groove 242A of the lid member 24 and flows down through the opening 242B.

Thus, even a sample having strong surface tension can smoothly move in the groove 242A to be transmitted to the pipe fitting 40.

The groove 242A of the lid member 24 has a smaller cross-sectional area than a groove having a cornered U cross-sectional shape.

Thus, the sample can be transmitted to the pipe fitting 40 in a shorter period of time.

(3) According to the present embodiment, as illustrated in FIG. 1, the liquid discharge tray 8 and the liquid discharge sensor 9 are provided in the casing 5 of the liquid chromatograph 2. The liquid discharge tray 8 receives the sample discharged from the connection pipe 25 through the pipe fitting 40 and the pipe 11. The liquid discharge sensor 9 detects the sample discharged into the liquid discharge tray 8.

Thus, the liquid discharge sensor 9 detects the sample leaked from the opening 241A of the lid member 24 of the valve device 6.

Thus, the leakage of the sample from the valve device 6 can be easily recognized through the detection by the liquid discharge sensor 9.

DESCRIPTION OF REFERENCE SIGNS 1 liquid chromatograph mass spectrometer
2 liquid chromatograph
3 mass spectrometer
5 casing
6 valve device
7 mass spectrometry section
8 liquid discharge tray
9 liquid discharge sensor
11 pipe
12 liquid discharge section
21 main body housing
23 flow path switching mechanism
24 lid member
25 connection pipe
31 rotor
32 stator
40 pipe fitting
241A opening
242A groove

The invention claimed is:

1. A liquid chromatograph mass spectrometer that is a combination of a liquid chromatograph and a mass spectrometer, the liquid chromatograph separating components in a sample, the mass spectrometer performing mass spectrometry on the components separated by the liquid chromatograph, the mass spectrometer comprising:
a mass spectrometry section that performs the mass spectrometry;
a casing that accommodates the mass spectrometry section;

a valve device that is interposed in a flow path for the sample from the liquid chromatograph to the mass spectrometry section and is attached to the casing; and a pipe fitting to which a liquid discharge pipe that communicates with a liquid discharge section is connected, wherein the valve device includes:

a hollow main body housing that is attached in the casing and has an opening section;

a flow path switching mechanism that is accommodated in the main body housing and switches the flow path;

a lid member that is detachably attached to the main body housing, includes a flow path connection section to which the flow path from the liquid chromatograph is connected, and closes the opening section of the main body housing; and a connection pipe that is attached to the lid member and connected to the pipe fitting to enable the sample leaked on the lid member from the flow path connection section to be discharged to the liquid discharge pipe, and the connection pipe is inserted in the pipe fitting in a state where the lid member is mounted to the main body housing.

2. The liquid chromatograph mass spectrometer according to claim 1, wherein a groove having a V cross-sectional shape into which the sample leaked from the flow path connection section flows is formed on the lid member, and the connection pipe communicates with a bottom section of the groove.

3. The liquid chromatograph mass spectrometer according to claim 1, wherein the liquid discharge section includes a liquid discharge tray that receives the sample discharged from the connection pipe through the pipe fitting and the liquid discharge pipe and a liquid discharge sensor that detects the sample discharged into the liquid discharge tray.

\* \* \* \* \*